(12) United States Patent
Abbott

(10) Patent No.: US 10,435,005 B2
(45) Date of Patent: Oct. 8, 2019

(54) ELECTRO-MECHANICAL BRAKING MONITORING SYSTEMS AND METHODS

(71) Applicant: Simmonds Precision Products, Inc., Vergennes, VT (US)

(72) Inventor: Michael Abbott, Shelburne, VT (US)

(73) Assignee: Simmonds Precision Products, Inc., Vergennes, VT (US)

(*) Notice: Subject to any disclaimer, the term of this patent is extended or adjusted under 35 U.S.C. 154(b) by 128 days.

(21) Appl. No.: 15/609,968

(22) Filed: May 31, 2017

(65) Prior Publication Data

US 2018/0345945 A1    Dec. 6, 2018

(51) Int. Cl.

| | | |
|---|---|---|
| *B60T 17/22* | (2006.01) | |
| *B60T 13/74* | (2006.01) | |
| *B60T 8/17* | (2006.01) | |
| *F16D 66/00* | (2006.01) | |
| *B60T 8/88* | (2006.01) | |

(52) U.S. Cl.
CPC ............ *B60T 17/22* (2013.01); *B60T 8/1703* (2013.01); *B60T 8/88* (2013.01); *B60T 13/741* (2013.01); *B60T 13/746* (2013.01); *F16D 66/00* (2013.01); *F16D 2066/005* (2013.01)

(58) Field of Classification Search
None
See application file for complete search history.

(56) References Cited

U.S. PATENT DOCUMENTS

| | | | |
|---|---|---|---|
| 6,959,794 B2 | 11/2005 | Ralea et al. | |
| 7,510,058 B2 | 3/2009 | Ether | |
| 8,204,661 B2 | 6/2012 | Godo | |
| 9,422,054 B2 | 8/2016 | Onfroy et al. | |
| 10,040,411 B2 * | 8/2018 | Nishida | B60T 8/00 |
| 2004/0238299 A1 * | 12/2004 | Ralea | B60T 7/085 188/156 |
| 2006/0152074 A1 | 7/2006 | Chico et al. | |
| 2007/0235267 A1 * | 10/2007 | Liebert | B60T 7/108 188/1.11 L |
| 2008/0084109 A1 * | 4/2008 | Griffith | B60T 7/12 303/89 |
| 2008/0154443 A1 | 6/2008 | Godo | |

(Continued)

FOREIGN PATENT DOCUMENTS

| | | |
|---|---|---|
| EP | 2871104 A1 | 5/2015 |
| EP | 3098126 A1 | 11/2016 |

OTHER PUBLICATIONS

Extended European Search Report dated Nov. 9, 2018, issued during the prosecution of corresponding European Patent Application No. EP 18175159.5 (9 pages).

*Primary Examiner* — Tamara L Weber
(74) *Attorney, Agent, or Firm* — Locke Lord LLP; Scott D. Wofsy; Alicia J. Carroll

(57) ABSTRACT

A brake monitoring and adjustment control system includes an electromechanical brake actuator controller (EBAC) and at least one sensor operatively connected to the EBAC. The sensor is configured to sense a characteristic of a brake and provide a feedback signal to the EBAC. The system includes a switch for turning power to the sensor on and off to reduce the duration with voltage applied to the sensor. Reducing the duration in which voltage is applied to the sensor reduces power consumption and assists with mitigating electromigration growth.

12 Claims, 1 Drawing Sheet

(56) References Cited

U.S. PATENT DOCUMENTS

2010/0292889 A1* 11/2010 Cahill ................... B60T 8/1703
701/29.1
2016/0193974 A1   7/2016 Nishida
2018/0215357 A1* 8/2018 Cahill ................... B60T 8/1703

* cited by examiner

ELECTRO-MECHANICAL BRAKING MONITORING SYSTEMS AND METHODS

BACKGROUND OF THE INVENTION

1. Field of the Invention

The present disclosure relates to monitoring and controlling aircraft systems, and more particularly to systems and methods for monitoring and controlling electro-mechanical braking systems.

2. Description of Related Art

Aircraft, like any other vehicle, rely on braking systems to slow down or stop. In many braking systems, an electronic brake actuator (EBA) may be controlled remotely by an electronic brake actuator controller (EBAC). In some scenarios, brake force variations due to external factors, such as temperature, require the EBAC to continually monitor the EBA, even when the aircraft is in a parking brake condition. This monitoring requires sensors and other circuitry that consumes power.

The conventional techniques have been considered satisfactory for their intended purpose. However, there is an ever present need for improved braking systems that minimize power consumption. This disclosure provides a solution for this need.

SUMMARY OF THE INVENTION

A brake monitoring and adjustment control system includes an electromechanical brake actuator controller (EBAC) and at least one sensor operatively connected to the EBAC. The sensor is configured to sense a characteristic of a brake and provide a feedback signal to the EBAC. The system includes a switch for turning power to the sensor on and off to reduce the duration with voltage applied to the sensor. Reducing the duration in which voltage is applied to the sensor reduces power consumption and assists with mitigating electro-migration growth.

The system includes a sampling timer operatively connected to the sensor and the switch for controlling the switch. The system includes an electromechanical brake actuator (EBA) operatively connected to the EBAC. It is contemplated that the sensor can be within the EBA. In accordance with some embodiments, the system includes an AC circuit resolver operatively connected to the EBA. The sensor can be a force sensor, and/or can be part of a load cell.

In accordance with another aspect, a method for monitoring and controlling an electromechanical brake system includes determining a brake operation mode. The method includes cycling power to at least one sensor operatively connected to an electromechanical brake actuator controller (EBAC) when the brake operation mode is a park/adjust mode to determine if a brake adjustment is required.

It is contemplated that cycling power to the sensor can include cycling the power on and off at a pre-determined frequency based on an expected re-adjustment frequency. The expected re-adjustment frequency can be based on worst-case thermal expansion data from a worn brake refuse-take-off (RTO) test. In accordance with some embodiments, cycling the power to a sensor includes receiving a signal from a sampling timer. The method can include monitoring a status of the EBA with a resolver, wherein the resolver is an AC circuit. The method can include adjusting a brake with an EBA if the brake adjustment is required. If the brake operation mode is a standby mode, the method can include switching off power to the sensor with a switch or cycling power to the sensor to determine if a brake adjustment is required.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
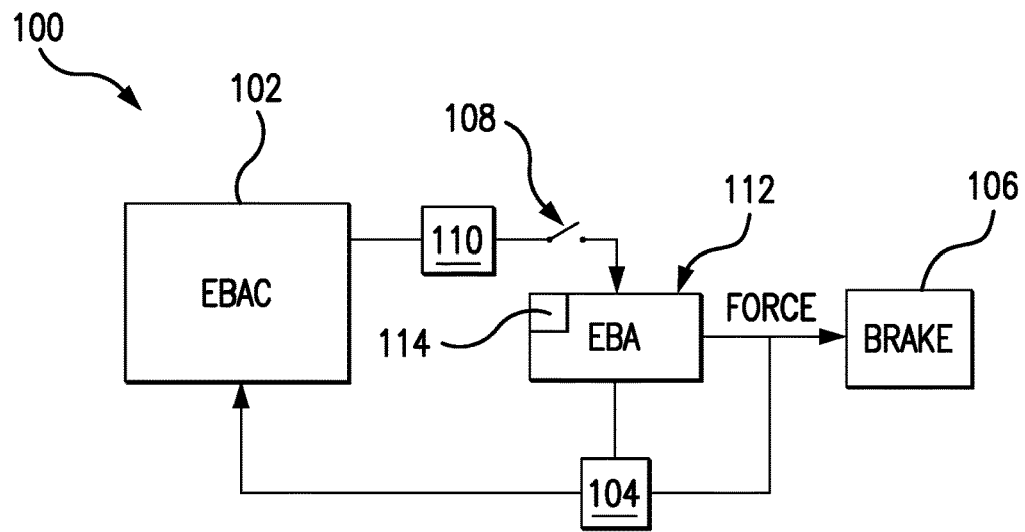
FIG. 1 is a block diagram of a brake monitoring and adjustment control system constructed in accordance with an embodiment of the present invention.
Figure 2:
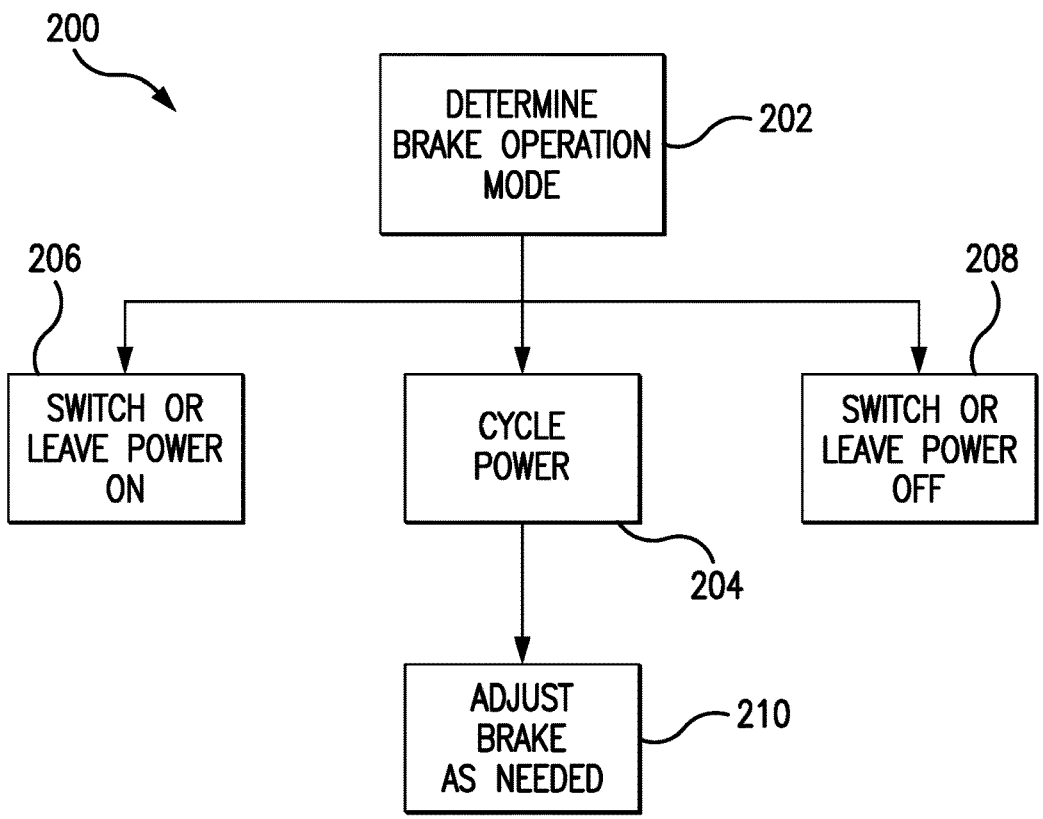
FIG. 2 is a flowchart illustrating the operation of the system in FIG. 1 in accordance with an embodiment of the present invention.

Reference will now be made to the drawings wherein like reference numerals identify similar structural features or aspects of the subject disclosure. For purposes of explanation and illustration, and not limitation, a partial view of an exemplary embodiment of a brake monitoring and adjustment control system in accordance with the disclosure is shown in FIG. 1 and is designated generally by reference character 100. Other embodiments of brake monitoring and adjustment control systems in accordance with the disclosure, or aspects thereof, are provided in FIG. 2, as will be described. The systems and methods described herein can be used in any suitable brake monitoring application to minimize the time that power is utilized, thereby reducing the rate of electro-migration growth. This results in prolonged life for wiring and connectors and increased actuator reliability by not allowing conductive paths to grow. It also reduces the overall power pulled from the aircraft and dissipated by the brake monitoring and adjustment control system.

A brake monitoring and adjustment control system 100 includes an electromechanical brake actuator controller (EBAC) 102 and at least one sensor 104 operatively connected to EBAC 102. Sensor 104 senses a characteristic of a brake 106 and/or an electromechanical brake actuator (EBA) 112 and provides a feedback signal to the EBAC 102. System 100 includes a switch 108 for turning power to sensor 104 on and off to reduce the duration with voltage applied to sensor 104. Reducing the duration in which voltage is applied to sensor 104 reduces power consumption, as compared to traditional brake monitoring and adjustment control systems, and assists with mitigating electro-migration growth.

System 100 includes a sampling timer 110 operatively connected to sensor 104 and switch 108 for controlling switch 108. System 100 includes an EBA 112 operatively connected to EBAC 102. It is contemplated that sensor 104 can be within EBA 112. In accordance with some embodiments, system 100 includes an AC circuit resolver 114 operatively connected to EBA 112. Sensor 104 can be a force sensor 104, can be part of a load cell, and/or can be an actuator position sensor. Multiple different types of sensors can be switched on and off at the same time. Sampling timer 110 allows the EBAC 102 of brake monitoring and adjustment control system 100 to monitor EBA 112, sensors 104 and brake 106 at a specific monitoring interval so that expansion and contraction effects are captured while minimizing the time that power is utilized. By monitoring in an interval, power can be removed from EBA 112 and/or sensor 104 when it is not required and re-enabled to sample the pertinent position and force data as required. The window of data is captured, processed, and determined if actuator control is required. If required, adjustments are made with EBA 112 and then sensor 104 shuts off again until the next sampling interval.

In accordance with another aspect, a method 200 for monitoring and controlling an electromechanical brake system, e.g. system 100, includes determining a brake operation mode, indicated schematically by box 202. Method 200 includes cycling power to at least one sensor, e.g. sensor 104, operatively connected to an EBAC, e.g. EBAC 102, when the brake operation mode is a park/adjust mode to determine if a brake adjustment is required, indicated schematically by box 204. If the brake operation mode is a normal braking mode, a gear retract stow braking mode, a brake operational test mode, a ground initiated test mode, a full brake retract mode, or an engine run park mode, power to the EBA and sensor is typically left on, indicated schematically by box 206. If the brake operation mode is a standby mode, the method can include switching off power to the sensor with a switch, e.g. switch 110, indicated schematically by box 208, or cycling power to the sensor to determine if a brake adjustment is required.

Cycling power to the sensor includes cycling the power on and off at a pre-determined frequency based on an expected re-adjustment frequency. In accordance with some embodiments, the expected re-adjustment frequency is based on worst-case thermal expansion data from a worn brake after a refuse-take-off (RTO) test. Those skilled in the art will readily appreciate that an RTO test is typically performed under the worst possible conditions, e.g. with fully worn out brakes, the plane loaded to maximum takeoff weight and no use of thrust reversers.

In accordance with some embodiments, cycling power on and off includes determining the total time that power is required to be on the EBA for each sample window. For example, where the sensor is a load cell, this duration includes the time it takes to turn on the load cell excitation, T1, the time it takes for the active circuit and load cell output to stabilize, T2, the window of time required to get enough samples of the load cell to determine if a re-adjust is required, T3, and the time to stop software sampling ahead of shutting off the power with the switch, T4. As such, T1+T2+T3+T4=the total time power is required to be onto the EBA. For example, if T1~50 ms, T2~50 ms, T3=20 ms, and T4=3 ms, the total time the power is required to be on for a given sample is 123 ms. In accordance with one embodiment, RTO data indicates that the actuators in the EBA need to re-adjust every 25 seconds. Even by conservatively running the sampling sequence (which, for example, takes approximately 123 ms) every 12 seconds, a considerable power savings is realized over traditional systems where the power to the EBA would be on for the entire park and adjust period (which typically lasts an hour).

Cycling the power to the sensor includes the sensor receiving a signal from a sampling timer, e.g. sampling timer 110, that instructs the sensor to begin sampling. Method 200 includes adjusting a brake, e.g. brake 106, with an EBA, e.g. EBA 112, if adjustment is required based on the sensor feedback received during the sampling window, as indicated schematically by box 210. In accordance with some embodiments, the position of the actuators of the EBA can be monitored with a resolver, e.g. resolver 114. The resolver can be an AC circuit.

The methods and systems of the present disclosure, as described above and shown in the drawings, provide for electromechanical brake monitoring systems with superior properties including reduced power consumption and minimized electro-migration growth, which assists in prolonging wiring, connector and actuator reliability by not allowing conductive paths to grow. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A brake monitoring and adjustment control system, comprising:
    an electromechanical brake actuator controller (EBAC);
    at least one sensor operatively connected to the EBAC for sensing a characteristic of at least one of a brake, or an electromechanical brake actuator (EBA) and providing a feedback signal to the EBAC; and
    a switch for turning power to the sensor on and off at a frequency based on an expected re-adjustment frequency to reduce the duration with voltage applied to the sensor, wherein the expected re-adjustment frequency is based on worst-case thermal expansion data from a worn brake refuse-take-off (RTO) test.

2. The brake monitoring and adjustment control system as recited in claim 1, further comprising a sampling timer operatively connected to the sensor and the switch for controlling the switch.

3. The brake monitoring and adjustment control system as recited in claim 1, further comprising an EBA operatively connected to the EBAC.

4. The brake monitoring and adjustment control system as recited in claim 3, wherein the sensor is within the EBA.

5. The brake monitoring and adjustment control system as recited in claim 3, further comprising an AC circuit resolver operatively connected to the EBA.

6. The brake monitoring and adjustment control system as recited in claim 1, wherein the sensor is a force sensor.

7. The brake monitoring and adjustment control system as recited in claim 1, wherein the sensor is part of a load cell.

8. A method for monitoring and controlling an electromechanical brake system, comprising:
    determining a brake operation mode; and
    cycling power to at least one sensor operatively connected to an electromechanical brake actuator controller (EBAC) when the brake operation mode is a park/adjust mode to determine if a brake adjustment is required, wherein cycling power to the sensor includes cycling the power on and off at a frequency based on an expected re-adjustment frequency, wherein the expected re-adjustment frequency is based on worst-case thermal expansion data from a worn brake refuse-take-off (RTO) test.

9. The method as recited in claim 8, wherein cycling the power to a sensor includes the sensor receiving a signal from a sampling timer.

10. The method as recited in claim 8, further comprising adjusting a brake with an EBA if the brake adjustment is required.

11. The method as recited in claim 8, further comprising switching off power to the sensor with a switch if the brake operation mode is a standby mode.

12. The method as recited in claim 8, further comprising cycling power to the sensor when the brake operation mode is a standby mode to determine if a brake adjustment is required.

* * * * *